United States Patent [19]

Patino

[11] Patent Number: 5,649,307
[45] Date of Patent: Jul. 15, 1997

[54] METHOD AND APPARATUS FOR OPTION CONTROL IN A RADIO ACCESSORY

[75] Inventor: Joseph Patino, Pembroke Pines, Fla.

[73] Assignee: Motorola, Inc., Schaumburg, Ill.

[21] Appl. No.: 506,984

[22] Filed: Jul. 28, 1995

[51] Int. Cl.$^6$ ...................................... H04B 1/38
[52] U.S. Cl. .................... 455/575; 455/90; 455/123; 455/350; 455/351; 455/200.1; 379/420; 331/103; 331/109; 331/123
[58] Field of Search ................. 455/89, 90, 100, 455/128, 344, 345, 346, 347, 348, 350, 351, 88, 200.1, 355, 899, 95; 379/58, 388, 420; 381/123, 109, 104, 122

[56] References Cited

U.S. PATENT DOCUMENTS

| | | | |
|---|---|---|---|
| 4,006,396 | 2/1977 | Bogut | 320/2 |
| 4,792,986 | 12/1988 | Garner et al. | 455/89 |
| 5,038,400 | 8/1991 | Baracat et al. | 455/90 |
| 5,118,309 | 6/1992 | Ford | 455/100 |
| 5,173,795 | 12/1992 | Branan, Jr. et al. | 455/89 |
| 5,212,722 | 5/1993 | Murata | 379/58 |
| 5,301,360 | 4/1994 | Goldberg | 455/89 |
| 5,535,433 | 7/1996 | Kurokawa et al. | 455/89 |

*Primary Examiner*—Reinhard J. Eisenzopf
*Assistant Examiner*—Doris To
*Attorney, Agent, or Firm*—Barbara R. Doutre

[57] ABSTRACT

An option select scheme (300) and circuit (200) allows a single analog-to-digital (A/D) line (211) to be used between an accessory (204) and a portable radio (202) to control first and second accessory features (234, 236). First and second variable resistive devices (226,228) are used in conjunction with a push-to-talk switch (PTT) (230) to control the first and second accessory features (234, 236). The PTT switch (230) allows the first variable resistive device (226) to present a first voltage range to the A/D line (211) in a first state when the PTT switch (230) is depressed. The PTT switch (230) allows the second variable resistive device (228) along with bias resistor (224) to present a second voltage range to the A/D line (211) in a second state when the PTT switch (230) is not depressed. A third state exists when the accessory (204) is disconnected from the radio (202) and a third voltage range is presented to the A/D line (211).

10 Claims, 3 Drawing Sheets

METHOD AND APPARATUS FOR OPTION CONTROL IN A RADIO ACCESSORY

TECHNICAL FIELD

This invention relates to electronic accessories for portable radios.

BACKGROUND

Portable radios are often used in conjunction with accessories which allow certain radio features to be enabled remotely. For example, remote speaker microphones are often worn by police officers in order to free up their hands and still maintain easy access to the radios' main functions. An operating feature which is typically enabled remotely is the push-to-talk (PTT) option which allows a user to push a PTT button on the remote accessory to talk through an external microphone, and release it to listen through an external speaker. Other features such as volume control and microphone gain can also be set by the user at the remote accessory. FIG. 1 of the invention shows a basic block diagram of a radio 102, and its remote enabled accessory 104 including speaker 106 and microphone 108. Remotely enabled accessories are typically interfaced to the radio through input/output (I/O) ports 110 located on both the radio 102 and the accessory 104.

Option select schemes of the past have typically used multiple I/O ports to transfer the various radio functions remotely. The addition of I/O ports between the radio and its remote accessory usually entails additional desense and static protection circuitry causing an increase in the size and cost of both the radio and the accessory. Also, if the accessory is coupled to the radio through a cable the increase in I/O ports translates into a thicker cable which has the disadvantage of adding bulk and weight for the user.

Accordingly, there is a need for an option select scheme that reduces the number of I/O ports between a radio and its' accessory.

DETAILED DESCRIPTION OF THE PREFERRED EMBODIMENT

Figure 1:
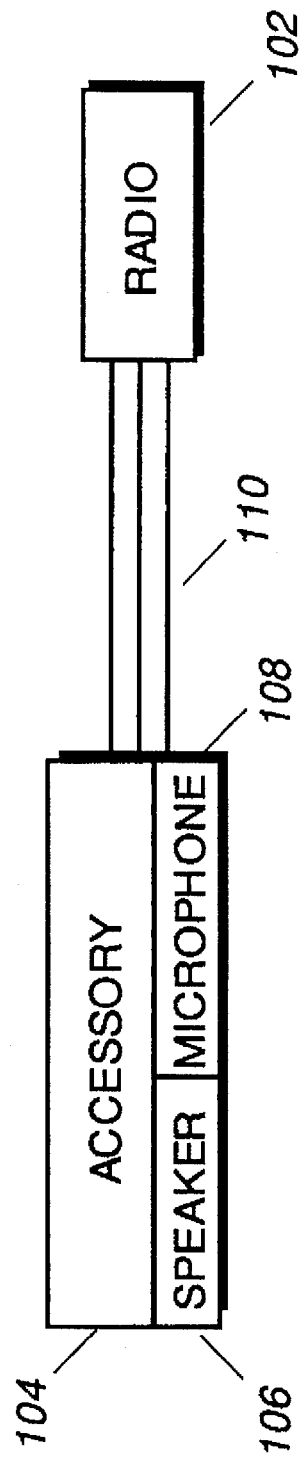
FIG. 1 is a prior art block diagram of an accessory coupled to a portable radio.
Figure 2:
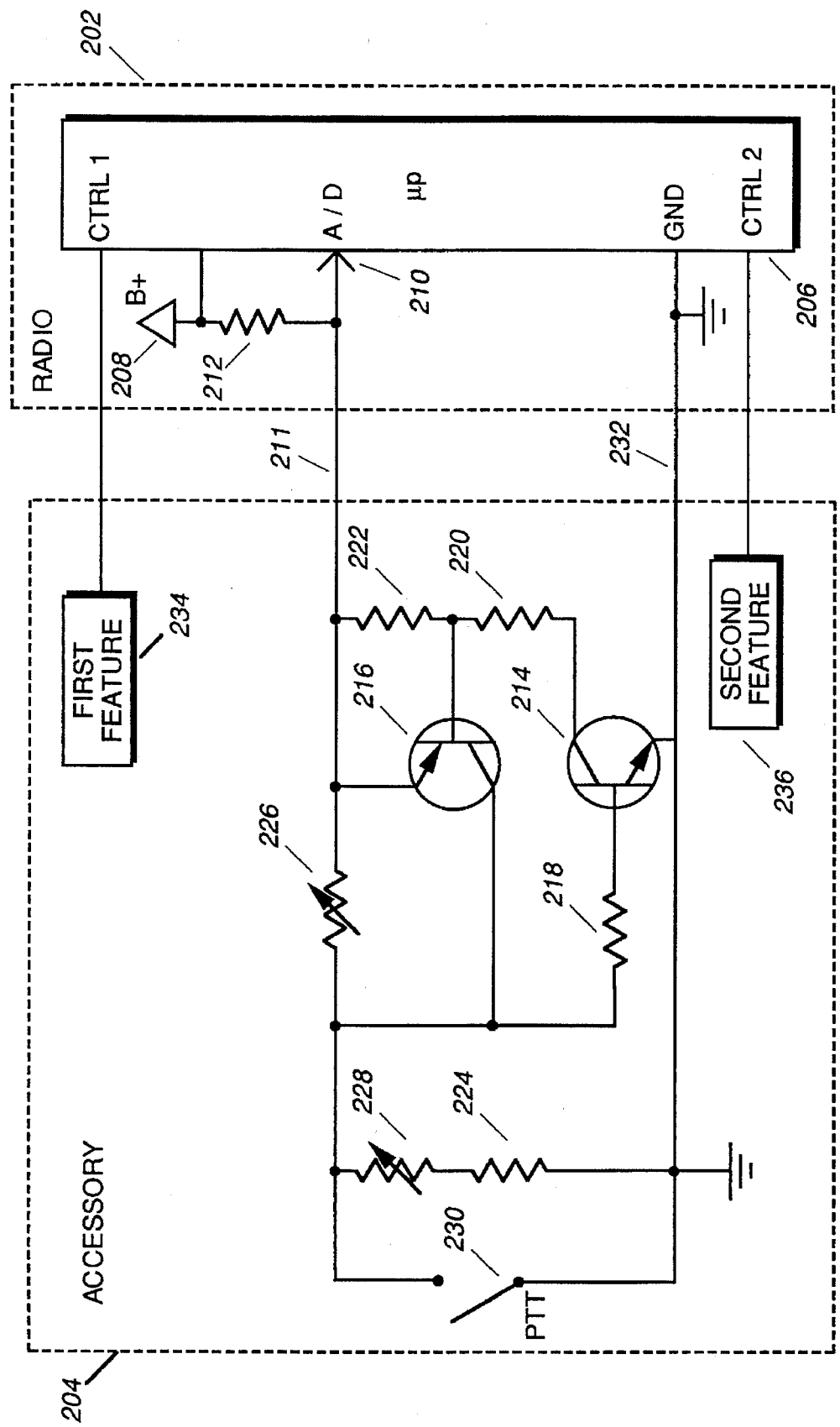
FIG. 2 is an electrical block diagram of the option select circuit in accordance with the present invention.

Referring now to FIG. 2 of the accompanying drawings, there is shown an electrical block diagram of an option select circuit 200 comprising a radio 202 and its remotely enabled electronic accessory 204 in accordance with the present invention. The radio includes a microprocessor 206 powered from a voltage supply source $B^+$ 208. The microprocessor 206 employs an analog to digital (A/D) converter port 210 as an option select input to receive input signals from accessory 204 through option select line 211, also known as A/D line 211. In the preferred embodiment of the invention, the A/D port 210 is preferably pulled high through resistor 212 when no accessory is connected to the radio 202. Accessory 204 includes first and second electronic switches 214 and 216 respectively, which are preferably implemented using inexpensive bipolar npn and pnp transistors as shown. Biasing circuitry for the first and second electronic switches 214, 216 includes biasing resistors 218, 220, 222, 224 and first and second variable resistive devices 226, 228, preferably implemented as potentiometers. A PTT switch 230 is coupled across second variable resistive device 228 and bias resistor 224. In the preferred embodiment, first variable resistive device 226 is used to control a first accessory feature 234, preferably a microphone gain setting. The second variable resistive device 228 is used to control a second accessory feature 236, preferably a speaker volume setting. The option select scheme of the preferred embodiment allows the single option select line 211 to determine the presence of an accessory, the state of the PTT switch, the control of the first accessory feature 234, preferably the microphone gain setting, and the control of the second accessory feature 236, preferably the speaker volume control.

In the preferred embodiment of the invention, second variable resistive device 228 and bias resistor 224 are coupled in series across the PTT switch 230. First variable resistive device 226 is preferably shorted across the emitter/collector of the second electronic switch 216 with the collector also being coupled back to the PTT switch 230. The emitter of second electronic switch 216 is coupled to the option select line 211. Bias resistor 222 is preferably coupled between the base of the second electronic switch 216 and the option select line 211, while bias resistor 220 is coupled between the base of the second electronic switch 216 and the collector of the first electronic switch 214. Bias resistor 218 is preferably coupled between the base of the first electronic switch 214 and the PTT switch 230 while the emitter of switch 214 is coupled to ground 232.

In the preferred embodiment, option select circuit 200 allows the microprocessor 206 to determine through option select line 211, the presence of an accessory, the state of the PTT switch, the microphone gain, and the speaker volume setting. First feature 234 preferably represents a microphone that has its gain set by input control CTRL1 of the microprocessor 206. Second feature 236 preferably represents a speaker whose gain is set by microprocessor output port CTRL2. Input/output ports CTRL1 and CTRL2 are responsive to the A/D port 210 for setting the microphone gain and speaker volume of accessory 204. Three states of operation provide three preferably distinct voltage ranges to the A/D port 2 10. The first voltage range occurs when the PTT switch 230 is depressed, the second voltage range occurs when the PTT switch is released, and the third voltage range occurs when the accessory 204 is disconnected from the radio 202.

The first voltage range occurs during the first state of operation when the PTT switch 230 is depressed shorting out bias resistor 224 and second variable resistive device 228. Shorting out bias resistor 224 and second variable resistive device 228 causes the first electronic switch, npn transistor, 214 biased via resistor 218 to be turned off. Turning the first electronic switch 214 off causes the second electronic switch, pnp transistor, 216 biased through resistors 220/222 to turn off thus assuring that first variable resistive device 226 is the only element switched into the option select line 211. For example, for a microprocessor powered from a 5 volt supply at $B^+$ 208, the first variable resistive device 226 can be implemented with a potentiometer selected to assure that the voltage range to the A/D port 210 remains in the 0–2 volt range. Thus the microprocessor 206 recognizes that the PTT switch 230 is pressed and can use the 2 volt swing to control the first accessory feature 234, such as the microphone gain setting. The user can adjust the first variable resistive device 226 until the microphone gain suits his/her individual requirements.

The second voltage range occurs during the second state of operation when PTT switch 230 is released which allows bias resistor 224 and second variable resistive device 228 to be switched into the circuit path. This cause the first electronic switch, npn transistor, 214, biased through resistor 218, to be turned on. Turning first electronic switch 214 on causes the second electronic switch 216, biased through resistors 220, 222 to turn on as well. Turning second electronic switch 216 on causes the first variable resistive device 226 to short out. Thus, only bias resistor 224 and second variable resistive device 228 actively impact the option select line 211 when the PTT switch 230 is released. Bias resistor 224, a fixed value, and second variable resistive device 228 (preferably implemented as a potentiometer) are preferably chosen to provide a second voltage range higher than, and not overlapping with, the first voltage range. For example, the values can be selected to provide a range of 2.1–4.0 volts. The microprocessor 206 then recognizes any voltage level within this range as indicating that the PTT switch 230 is not depressed and uses this additional voltage swing for determining and controlling the second accessory feature 236, such as the speaker volume setting. The user can thus adjust the second variable resistive device until the speaker volume suits his/her needs.

The third voltage range occurs during the third state of operation when the accessory 204 is disconnected from the radio 202 causing the A/D port 210 to float high through resistor 212. For example, the microprocessor could be programmed to determine that any voltage reading on the A/D port 210 higher than 4.1 volts indicates that no accessory is connected to the radio 202.

In the preferred embodiment of the invention, the values of the first and second variable resistive devices 226, 228 and bias resistor value 224 are preferably chosen such that three distinct voltage ranges are available to the A/D port 210. For the example of the microprocessor 206 being powered from a 5 volt supply at B$^+$ 208, one could select bias resistor 224 (R224) and first and second variable resistive devices 226, 228 (R226, R228) to provide the 0–2 volt range, the 2.1–4.0 volt range, and the 4.1–5.0 volt range using the following voltage divider computations with a given value selected for resistor 212 of 10 kilo-ohm (abbreviated using both Kohm and K):

PTT depressed & R226 minimum (min)

$$Va/d = 0\ V = \frac{(R226)(5)}{(R226) + (10K)}$$

R226 min = 0

PTT depressed & R226 maximum (max)

$$Va/d = 2.0\ V = \frac{(R226)(5)}{(R226) + (10K)}$$

$$R226\ max = \frac{(2.0)(10K)}{(5 - 2.0)} = 6.667\ Kohm$$

$$0 \leq R226 \leq 6.667\ Kohm$$

PTT released & R228 min $$Va/d = 2.1\ V = \frac{(R228 + R224)(5)}{(R228 + R224) + (10K)}$$

R228 min = 0

$$R224 = \frac{(2.1)(10K)}{(5 - 2.1)} = 7.241\ Kohm$$

PTT released & R228 max $$Va/d = 4.0\ V = \frac{(R228 + R224)(5)}{(R228 + R224) + (10K)}$$

$$R228\ max = \frac{(4.0)(10K)}{(5 - 4.0)} - R3 = 32.759\ Kohm$$

$$0 \leq R228 \leq 32.759\ Kohm$$

Thus, for a 5 volt supply and the desired voltage ranges described in the example, first variable resistive device 226 could be implemented with a 0–6.6 Kohm potentiometer, second variable resistive device 228 could be implemented with a 0–32.7 Kohm potentiometer, and bias resistor 224 could be implemented with a fixed 7.2 Kohm resistor. The first and second variable resistive devices 226, 228 provide first and second variable resistive loads to the A/D line 211. The step resolution on an 8 bit A/D then becomes 5 volts divided by 255 steps which equals 0.0196 volts per step. For the above example, first and second variable resistive devices 226, 228 were chosen for a 2 volt (V) range at the input to the A/D port 210, the effective resolution is thus (2.0 V/0.0196 V≈100) 100 discernible steps by the microprocessor 206. Resistor values, supply voltage, and voltage ranges can be varied to suit different application needs.

Figure 3:
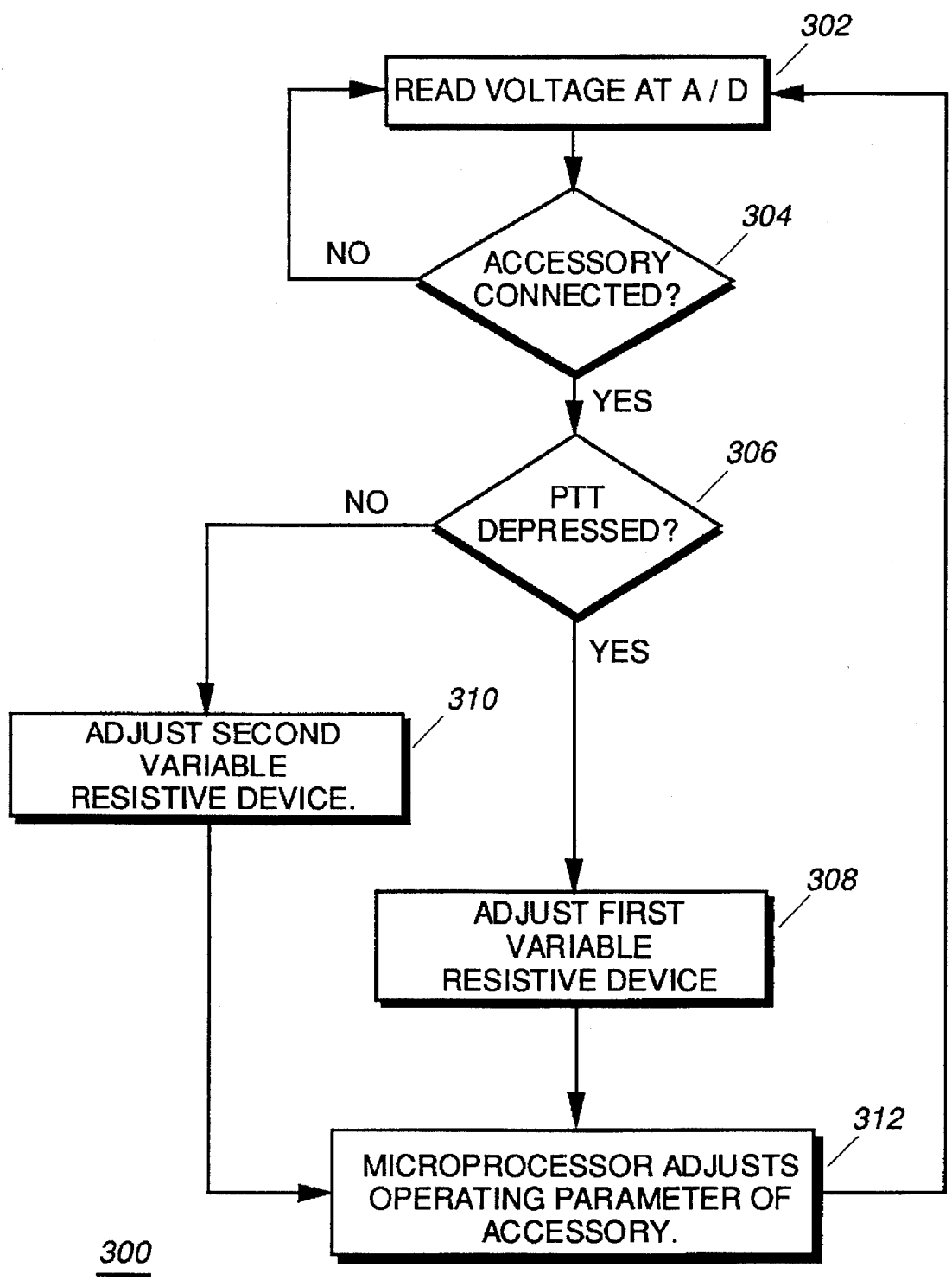
FIG. 3 is a flow chart of an option select scheme in accordance with the present invention.

Referring now to FIG. 3, there is shown a flowchart of the option select scheme 300 in accordance with the present invention. In the first step 302, the microprocessor 206 of the radio 202 reads the A/D port 210 to determine if an accessory is present. If the voltage range indicates that no accessory is present at step 304 the radio continues to function alone, otherwise an accessory is deemed to be present and the flowchart continues on to step 306. If the voltage detected by the A/D port 210 falls within a range indicating that the PTT switch 230 is depressed at step 306, then the user can adjust the first variable resistive device 226 at step 308, such as to control the microphone gain. If the A/D port 210 reads a voltage that falls within a range that indicates the PTT switch 230 is not depressed then the user can adjust the second variable resistive device 228 in step 310, such as to control the speaker volume. The input voltage to the A/D port 210 is monitored continuously and as the variable resistive devices are adjusted by the user the microprocessor 206 controls the operating parameter for the first accessory feature 234, such as the microphone gain, or second accessory feature 236, such as the speaker volume, of the accessory 204.

Hence, the accessory circuit as described by the invention uses a single A/D line to sense the presence of an accessory and to control remotely accessible features, such as microphone gain and speaker volume. By combining the number of ports required between the radio and its accessory the overall cost decreases as well as the bulk and weight between the two devices.

While the preferred embodiments of the invention have been illustrated and described, it will be clear that the invention is not so limited. Numerous modifications, changes, variations, substitutions, and equivalents will occur to those skilled in the art without departing from the spirit and scope of the present invention as defined by the appended claims.

What is claimed is:

1. A method of controlling first and second accessory features between an accessory and a radio:

providing an A/D line between the accessory and the radio;

monitoring the A/D line from the radio;

depressing a push-to-talk (PTT) switch at the accessory to provide a first voltage range to the A/D line;

releasing the PTT switch at the accessory to provide a second voltage range to the A/D line;

adjusting a first accessory feature by varying a voltage within the first voltage range; and adjusting a second accessory feature by varying a voltage within the second voltage range.

2. A method of controlling first and second accessory features as described in claim 1, wherein the first accessory feature is microphone gain and the second accessory feature is speaker volume and the step of adjusting the first accessory feature includes the step of adjusting the microphone gain when the PTT switch is depressed and the step of adjusting the second accessory feature includes the step of adjusting the speaker volume when the PTT switch is not depressed.

3. A method of adjusting speaker volume and microphone gain of an accessory having a push-to-talk (PTT) switch, said accessory coupled to a radio, comprising the steps of:

sensing the push-to-talk (PTT) switch at the radio through an A/D line;

depressing the PTT switch;

adjusting the microphone gain through the A/D line when the PTT switch is depressed;

releasing the PTT switch; and adjusting the speaker volume through the A/D line when the PTT switch is released.

4. The method of claim 3, wherein the step of depressing the PTT switch includes the step of providing a first voltage range to the A/D line and the step of releasing the PTT switch includes the step of providing a second voltage range to the A/D line.

5. The method of claim 4, comprising the further steps of:

varying a first resistive load at the A/D line while the PTT switch is depressed to provide the first voltage range; and varying a second resistive load at the A/D line while the PTT switch is released to provide the second voltage range.

6. The method of claim 4, wherein the step of adjusting the microphone gain comprises the steps of:

setting a voltage level within the first voltage range; and sensing the voltage level on the A/D line at the radio.

7. The method of claim 4, wherein the step of adjusting the speaker volume comprises the steps of:

setting a voltage level within the second voltage range; and sensing the voltage on the A/D line at the radio.

8. An electronic accessory for remotely enabling communication functions of a portable radio, comprising:

an analog to digital (A/D) line coupled between the accessory and the portable radio;

at the accessory:

a first electronic switch;

a second electronic switch;

biasing circuitry for turning the first electronic switch off and the second electronic switch off in a first state and for turning the first electronic switch on and the second electronic switch on in a second state;

a first variable resistive device operatively coupled to the biasing circuitry for controlling a first voltage range to the A/D line in the first state;

a second variable resistive device operatively coupled to the biasing circuitry for controlling a second voltage range to the A/D line in the second state; and a push-to-talk switch operatively coupled to the first and second variable resistive devices for switching in the first state when depressed and the second state when not depressed.

9. An electronic accessory as described in claim 8, wherein the first voltage range controls microphone gain and the second voltage range controls speaker volume of the electronic accessory.

10. An electronic accessory as described in claim 8, wherein a third voltage range is supplied to the A/D line when the electronic accessory is removed from the portable radio.

* * * * *